United States Patent
McCormack et al.

(10) Patent No.: US 9,172,810 B2
(45) Date of Patent: Oct. 27, 2015

(54) SYSTEM AND METHOD FOR CALCULATING CONTEXT-AWARE ESTIMATED WAIT TIME FOR CUSTOMERS

(71) Applicant: Avaya Inc., Basking Ridge, NJ (US)

(72) Inventors: Tony McCormack, Galway (IE); Siobhán Dervan, Galway (IE); Paul D'Arcy, Limerick (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/928,575

(22) Filed: Jun. 27, 2013

(65) Prior Publication Data
US 2015/0003604 A1    Jan. 1, 2015

(51) Int. Cl.
*H04M 3/51* (2006.01)
*H04M 3/523* (2006.01)

(52) U.S. Cl.
CPC .......... *H04M 3/5238* (2013.01); *H04M 3/5233* (2013.01)

(58) Field of Classification Search
CPC .......................... H04M 3/5233; H04M 3/5238
USPC ............... 379/265.01, 265.02, 265.1, 265.11, 379/265.14, 266.06, 265.12, 265.13
See application file for complete search history.

(56) References Cited

U.S. PATENT DOCUMENTS

| | | | |
|---|---|---|---|
| 5,506,898 A * | 4/1996 | Costantini et al. | 379/266.06 |
| 5,867,572 A * | 2/1999 | MacDonald et al. | 379/266.06 |
| 6,694,009 B1 * | 2/2004 | Anderson et al. | 379/266.06 |
| 8,094,802 B2 * | 1/2012 | Alvarado et al. | 379/265.01 |
| 8,594,311 B2 * | 11/2013 | Williams et al. | 379/266.06 |
| 2002/0067822 A1 * | 6/2002 | Cohen et al. | 379/265.12 |
| 2002/0143592 A1 * | 10/2002 | Nishikawa et al. | 705/7 |
| 2003/0103620 A1 * | 6/2003 | Brown et al. | 379/266.01 |
| 2003/0108187 A1 * | 6/2003 | Brown et al. | 379/266.03 |
| 2005/0207559 A1 * | 9/2005 | Shtivelman et al. | 379/266.06 |
| 2007/0127691 A1 * | 6/2007 | Lert, Jr. | 379/265.05 |
| 2008/0063180 A1 * | 3/2008 | Barsness et al. | 379/265.14 |
| 2011/0255683 A1 | 10/2011 | Flockhart et al. | |

* cited by examiner

*Primary Examiner* — Harry S Hong
(74) *Attorney, Agent, or Firm* — Maldjian Law Group LLC

(57) ABSTRACT

An Estimated Wait Time (EWT) computing system for computing estimated wait time for customers in a contact center is provided. The EWT computing system includes an analysis module for analyzing each incoming contact to determine attributes corresponding to the incoming contact. The EWT computing system further includes a categorization module for categorizing the incoming contact based on the determined attributes and a past history of the incoming contact or similar contacts. The EWT computing system further includes a computing module for computing an estimated wait time for the incoming contact based on a category of the incoming contact and availability of suitable agents for handling the incoming contact. The EWT computing system further includes a reporting module for reporting the estimated wait time to the incoming contact.

18 Claims, 3 Drawing Sheets

SYSTEM AND METHOD FOR CALCULATING CONTEXT-AWARE ESTIMATED WAIT TIME FOR CUSTOMERS

BACKGROUND

1. Field of the Invention

Embodiments of the present invention generally relate to a system and method for providing customer service in a contact center and particularly to a system and method for calculating estimated wait time for customers.

2. Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are client or operator-specifiable (i.e., programmable by the operator of the contact center), via a capability called vectoring. Normally in present-day automatic call distributor (ACD) when the ACD system's controller detects that no agents are available for handling incoming contacts, the contacts are placed in queues to wait till an agent becomes available to service the incoming contacts. When an agent becomes available to handle the contact, the ACD system's controller identifies all predefined contact-handling queues for the agent (usually in some order of priority) and delivers to the agent the highest-priority, oldest contact that matches the agent's highest-priority queue.

For smooth and effective functioning of routing calls in the contact center is to estimate how long a contact has to wait in the queue before being serviced by an agent of the contact center. Existing solutions for calculating Estimated Wait Time (EWT) metrics in a contact center use simple counting algorithms, and/or generic averages to inform the estimates to the incoming contacts. The average values used are calculated across a whole contact center system, for a whole queue or for high-level groupings such as 'new customer', 'support' or 'sales'. Further, unaccounted variations, such as complexity of contacts, associated with using generically averaged values lead to inaccurate estimations and unreliability in a real world system. Therefore, Estimated Wait Time can become increasingly inaccurate if other contacts being handled at the time of calculation take longer time to process than initially predicted by using the algorithms.

In addition to the varying complexity of contacts queued or in progress, the skills and efficacy of specific agents available at request time can have a dramatic effect on the accuracy of the calculated Estimated Wait Time. The agent(s) most suited to service an incoming contact may not be working on that day, and therefore the 'average handling time' value would be skewed as the existing solutions include these agents with the high efficacy and best handling times while calculating the estimated wait time for the incoming contacts.

Further, existing solutions use an agent desktop application to update an estimation of the estimated wait time based on the agent progress on the ongoing contact. The progress of the ongoing contacts is either updated manually by an agent or automatically through indicators (explained below). Therefore, this may lead to inaccurate estimates of the estimated wait time for the incoming contacts.

Further, existing solutions use averaging formulae by creating data points during the processing of each contact to improve the accuracy of estimated wait time predictions. Typical data points include such as when a contact enters or exits a queue, how fast a contact progresses through a queue, when an agent logs in or out or goes on break or returns from break, etc. In addition, an improved method to improve the accuracy of estimated wait time is proposed by creating additional data points during the processing of each incoming contact. The improved method makes use of indicators to inform the estimate of how much time the incoming contact will take to conclude. The indicators can be actuated either manually by an agent of the contact center, or automatically. The indicators may include 'New customers', 'existing customers', and 'Wrap up'. However, these methods of calculating Estimated Wait Time are too simplistic, as they use generically averaged values to inform the estimate wait time for the customers.

There is thus a need for an improved customer support service system and method to provide most accurate estimate wait time for every contact currently queued or being handled by the system.

SUMMARY

Embodiments in accordance with the present invention provide an estimated wait time (EWT) computing system for computing estimated wait time for customers in a contact center. The EWT computing system includes an analysis module for analyzing each incoming contact to determine attributes corresponding to the incoming contact. The EWT computing system further includes a categorization module for categorizing the incoming contact based on the determined attributes and a past history of the incoming contact or similar contacts. The EWT computing system further includes a computing module for computing an estimated wait time for the incoming contact based on a category of the incoming contact and availability of suitable agents for handling the incoming contact. The EWT computing system further includes a reporting module to report the estimated wait time to the incoming contact.

Embodiments in accordance with the present invention further provide a computer-implemented method for calculating context based estimated wait time for customers. The computer-implemented method includes analyzing each incoming contact to determine attributes corresponding to the incoming contact, categorizing the incoming contact based on the determined attributes and a past history of the incoming contact or similar contacts, and computing an estimated wait time for the incoming contact based on a category of the incoming contact and availability of suitable agents for handling the incoming contact.

Embodiments in accordance with the present invention further provide a contact center that includes a processor, and a memory coupled to the processor, the memory comprising one or more instructions executable by the processor to analyze each incoming contact to determine attributes corresponding thereto, categorize the incoming contact based on the determined attributes and a past history of the incoming contact or similar contacts, compute an estimated wait time for the incoming contact based on a category of the incoming contacts and availability of suitable agents for handling the incoming contact, and report the estimated wait time to the incoming contact.

The present invention can provide a number of advantages depending on its particular configuration. First, the present invention provides a EWT computing system for analysis of a contact and its related context received from a customer of a contact center. The analysis of the context of the received contact provides an accurate estimation of an anticipated handling time required by an agent of the contact center for providing services to the customer. Further, the EWT computing system provides an accurate analysis of the estimated wait time for the customers of an incoming contact. Further, the EWT computing system is an automated system for computing an estimated wait time for the customer of the incoming contact.

These and other advantages will be apparent from the disclosure of the present invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
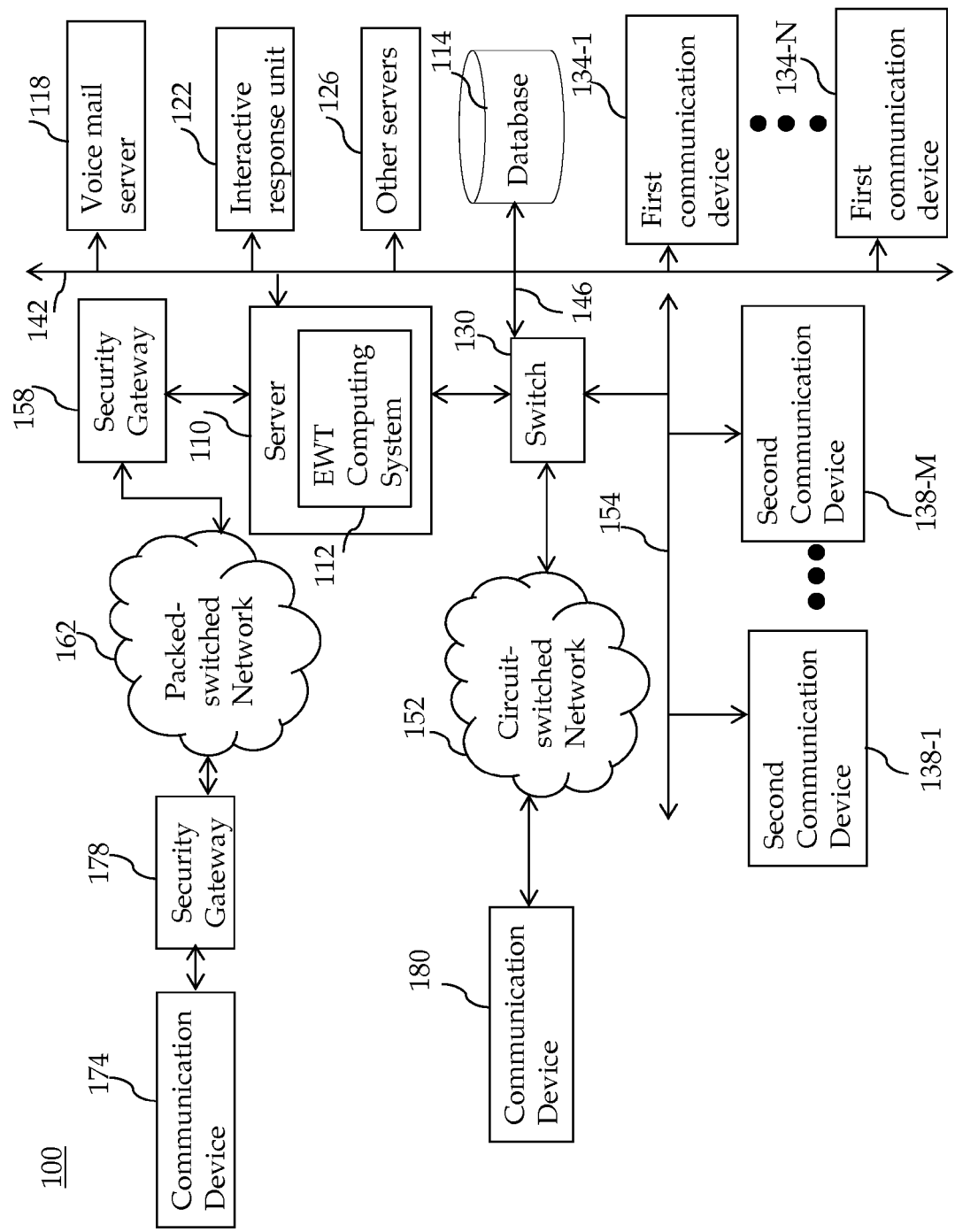
FIG. 1 is a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an ACD or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/ or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

FIG. 1 shows an illustrative embodiment of the present invention. A contact center 100 comprises a central server 110, a set of data stores or databases 114 containing contact or customer related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The plurality of servers may include a voice analyzing capability e.g., a natural language processing system to analyze attributes of incoming voice contacts. The central server 110 includes an Estimated Wait Time (EWT) computing system 112, according to an embodiment of the present invention. The EWT computing system 112 may be an application stored as a software or firmware. The computed estimated wait time may be stored in a database of the EWT computing system 112. The servers may be connected via optional communication lines 146 to the switch 130. As will be appreciated, the other servers 126 may also include a scanner (which is normally not connected to the switch 130 or Web server), VoIP software, video call software, voice messaging software, an IP voice server, a fax server, a web server, an email server, and the like. The other servers 126 may include servers to receive textual contacts e.g., emails, web chats, social media chats, and instant messages. Further, the other servers 126 may include analysis capability (e.g., suitable software, hardware, firmware or combination of software and hardware) for analyzing attributes of the textual contacts. The switch 130 is connected via a plurality of trunks 150 to the Public Switch Telephone Network or PSTN 152 and via link(s) 154 to the second communication devices 138-1 to M. A gateway 158 is positioned between the central server 110 and the packet-switched network 162 to process communications passing between the central server 110 and the packet-switched network 162.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention does not require the presence of packet- or circuit-switched networks.

The switch 130 and/or central server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or central server 110 may be a modified form of the subscriber-premises equipment sold by Avaya Inc. under the names Definity™ Private-Branch Exchange (PBX)-based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company.

Typically, the switch 130 and/or central server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

The security gateway 158 may be implemented as hardware such as via an adjunct processor (as shown) or as a chip in the server.

The first communication devices 134-1, . . . 134-N are packet-switched and may include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1 . . . 138-M corresponds to one of a set of internal extensions Ext1, . . . ExtM, respectively. The second communication devices may include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch, or server and first and second communication devices, i.e., the present invention may be implemented with any desired type of transport medium as well as combinations of different types of transport channels.

The packet-switched network 162 can be any data and/or distributed processing network, such as the Internet. The packet-switched network 162 typically includes proxies (not shown in the figure), registrars (not shown in the figure), and routers (not shown in the figure) for managing packet flows.

The packet-switched network 162 is in communication with a communication device 174 via a security gateway 178, and the circuit-switched network 152 with an external second communication device 180.

In a preferred configuration, the central server 110, packet-switched network 162, and first communication devices 134 are Session Initiation Protocol or SIP compatible and may include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the present invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving telecommunications component until the central server 110 forwards instructions to the component to forward or route the contact to a specific contact center resource, such as the IVR unit 122, the voice mail server 118, and/or first or second telecommunication device 134, 138 associated with a selected agent of the contact center 100. The central server 110 distributes and connects these contacts to telecommunication devices of available agents based on the predetermined criteria noted above. When the central server 110 forwards a voice contact (or first work item) to an agent, the central server 110 also forwards customer-related information from the database 114 to the agent's computer work station for viewing (such as by a pop-up display) to permit the agent to better serve the customer. Depending on the contact center configuration, the central server 110 may forward a list of contacts to an available agent to preview before forwarding the contact itself and the data associated therewith to the agent. The agents process the work items or contacts sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

Figure 2:
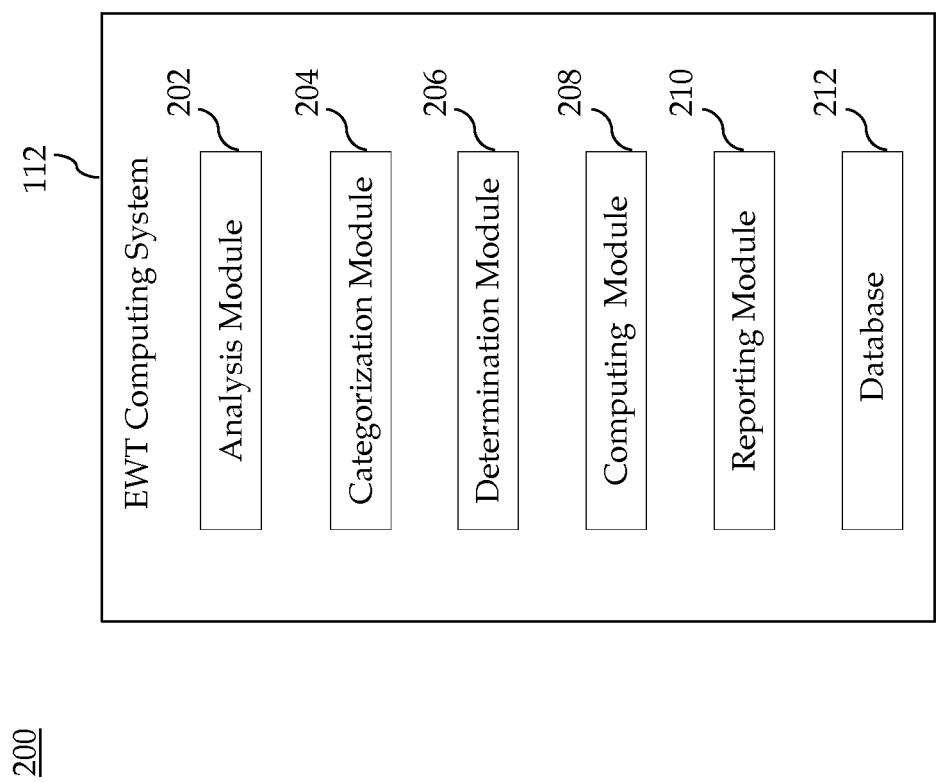
FIG. 2 is a block diagram of an Estimated Wait Time Computing System according to an embodiment of the present invention.

Referring to FIG. 2 that illustrates a block diagram of an Estimated Wait Time (EWT) computing system according to one embodiment of the present invention. As depicted, the Estimated Wait Time (EWT) computing system 112 includes an analysis module 202, a categorization module 204, a determination module 206, a computing module 208, a reporting module 210, and a database 212.

The analysis module 202 is configured to analyze each incoming contact to determine attributes corresponding to an incoming contact. The attributes corresponds to details of the incoming contact and purpose of calling (or requesting) by the incoming contact. Herein, the incoming contact is a customer requesting the contact center (such as the contact center 100) for one or more services corresponding to a request of the contact. In an embodiment of the present invention, the analysis module 202 may analyze the incoming contact based on present and past communications with the incoming contact or similar contacts. In an embodiment, the analysis module 202 analyzes the incoming contact based on at least one of email messages, web chats, text messages, sentiments of the incoming contact on one or more social network, and voice calls corresponding to the incoming contact or similar contacts. Hereinafter, the term 'incoming contact' may interchangeably be referred to as 'contact'. The similar contacts include requests by previous contacts (other than the incoming contact) having similar request.

Further, the analysis module 202 may determine the attributes of the incoming contact by analyzing activities corresponding to selection of options, by the incoming contact, from an IVR menu of the contact center. For example, the analysis module 202 may analyze input keys selected by the contact in an IVR menu of the contact center, or PIN number entered by the contact. In addition, the analysis module 202 may use a Natural Processing Language (NLP) engine (not shown in the figure) to analyze context of the incoming contact. The NLP engine may be used to produce an accurate representation of the exact context and complexity of each incoming contact. For example, if the customer responds to a question, whether verbal or written, during the contact, the NLP engine may process the response of the customer to extract information from the incoming contact.

In an embodiment, the analysis of the incoming content includes contextual analysis of the incoming content. The contextual analysis may provide information corresponding to the contact. Further, based on the analysis of the context of the contact (customer), corresponding transaction or request of the contact may be profiled and stored in the database 212. For example, based on the analysis of the context of the contact who calls the contact center, it may be determined whether the transaction or the request of the contact includes one type of query/request or multiple queries/requests. Further, based on the context analysis of the contact, it may be determined if the contact is a gold customer with a strong propensity to purchase goods and services. Further, the analysis module 202 may analyze the context of the contact and accordingly may determine that the content is providing negative sentiments or positive remarks about a product or service corresponding to the contact center.

The positive sentiments may indicate that the contact is happy and satisfied during a call (for a transaction or a work request) to the contact center. The negative sentiments may indicate that the customer is unhappy and unsatisfied during the call to the contact center. For example, the negative sentiments may be determined based on the content (verbal or written) of the contact used for the transaction (or communication) with the contact center. Furthermore, the analysis module 202 may determine if the contact shows angriness through yelling or shows sadness through his/her words (verbal or written) or acts.

Further, based on the context analysis, the analysis module 202 may categorize the contact as a complex contact or simple contact. For example, if the context of the contact indicates that the request of the contact includes multiple queries, the analysis module 202 may categorise the contact as a complex contact. Otherwise, if the request of the contact includes a single request, the analysis module 202 may categorize the contact as a simple contact. Furthermore, the analysis module 202 may sub-categorize a contact in a category based on the context analysis. For example, if the context of the contact indicates that the request of the contact includes multiple queries and a negative sentiment, the analysis module 202 may sub-categorize the contact as a complex negative contact. Otherwise, if the context of the contact indicates that the request of the contact includes multiple queries and a positive sentiment, the analysis module 202 may sub-categorize the contact as a complex positive contact.

Further, the analysis module 202 may analyze additional contextual information from a social environment. In an embodiment of the present invention, sentiments of the incoming contact are monitored by observing the sentiments on social networks. For example, the analysis module 202 may analyze social networks to monitor sentiments of the contact. If the contact has provided negative statement (on the social network) about the product or service corresponding to the contact center, analysis module 202 may detect such negative statements (or positive remarks) provided by the contact.

Further, the database 212 may store one or more characteristics corresponding to each incoming contact. The one or more characteristics corresponding to the incoming contact may include, but are not limited to, determined attributes and activities corresponding to selection of options from an IVR menu corresponding to the contact center. In an embodiment of the present invention, the determined attributes (of the incoming contact) may include the activities corresponding to selection of options from an IVR menu corresponding to the contact center. Further, in an embodiment of the present invention, the database 212 may store a past history of the incoming contact or similar contacts.

Further, the categorization module 204 may categorize the incoming contact based on the determined attributes and a past history of the incoming contact or similar contacts. In an embodiment of the present invention, the incoming contact is categorized based only on the determined attributes from the incoming contact. For example, in case the contact is a new customer approaching the contact center for a request regarding any product or service corresponding to the contact center, the database 212 may not have any previous history stored therein corresponding to the new customer. In this case, the contact may be categorized based on one or more attributes, of the new customer, that may be determined based on the context of the contact. In another embodiment of the present invention, the incoming contact is categorized based on the determined attributes and the past history of the incoming contact. The past history of the incoming contact may include attributes and/or information associated with the incoming contact.

Further, the determination module 206 is configured to determine one or more suitable agents from a plurality of agents based on the determined attributes of the incoming contact. In an embodiment of the present invention, one or more suitable agents are determined based on the determined attributes of the incoming contact, from a plurality of agents available at the time of receiving the incoming contact. For example, in a contact center, ten agents are available at the time of receiving a request from an incoming contact. Based on the determined attributes of the incoming contact, if it is determined that five agents are suitable for handling the incoming contact. So, such five suitable agents may be selected from the pool of ten available agents in the contact center for providing services to the incoming contact.

Further, the determination module 206 matches the determined attributes of the incoming contact with skill sets of each of the plurality of available agents to determine the suitable agents from the plurality of agents. Herein, the term 'skill set' of an agent may refer to a set of agent attributes that is used by the contact center to characterize an agent. Such agent attributes may include biographical agent attributes, demographic agent attributes, and external or internal behavioural agent attributes. The behavioural attributes can include the agent's history with respect to the contact center and/or any other entity or social media channel. However, the agent attributes is not limited in this regard and can include any other type of agent attributes used by the contact center to characterize or classify agents. Further, the agent attributes can include any other agent attributes collected from one or more sources external to the contact center.

Additionally, the agent profile can be raw data or processed agent attributes. That is, the agent attributes can be analyzed to characterize the agent and thereafter used to provide customized or personalized services to the user/customer. For example, an agent profile can be a set of values associated with an agent and a set of characteristics, where the values are selected based on the agent attributes obtained. However, the present invention is not limited to the examples and embodiments provided herein for evaluating agent data.

In an embodiment of the present invention, the Estimated Wait Time (EWT) computing system 112 makes use of an existing system of one to one matching of attributes of an incoming contacts with the attributes of the agents skill sets. In another embodiment of the present invention, matching of the determined attributes with the skill sets of the plurality of the agents is based on predefined rules that may be stored in the database 114 of the contact center 100.

Further, the determination module 206 is configured to determine a set of suitable agents based on the past experiences of the available agents. In an embodiment of the present invention, agents are selected based on the past experiences of the agents dealing with one or more contacts having attributes similar to the incoming contact. For example, agents who have handled similar contacts (similar to the incoming contact) in the past may be given priority to handle the incoming contact.

The computing module 208 is configured to compute an estimated wait time for the incoming contact based on a category of the incoming contact and availability of suitable agents to handle the incoming contact. In an embodiment of the present invention, the one or more characteristics corresponding to the incoming contact may include, but are not limited to, the determined attributes and activities corresponding to selection of options from an IVR menu corresponding to the contact center. The determined characteristics of the incoming contact may be compared with the attributes of previously stored contacts in the database 212 of the EWT computing system 112. Accordingly, an estimate of predicted handling time may be calculated for the incoming contact by analyzing the time taken by the agents in handling similar contacts in the past.

In another embodiment of the present invention, an estimate of predicted handling time for the incoming contact is computed by taking into account skill sets of available agents of the contact center. Further, performance and capabilities of the selected agents in handling similar contacts are taken into account for computing an estimate of the predicted handling time of the incoming contact. For example, the estimated wait time for the incoming contact is computed by considering past experiences, performance and capabilities of the selected agents in providing services to the contacts with similar attributes as that of the incoming contact.

Further, the computing module 208 is configured to compute estimated wait time for the incoming contact. In an embodiment of the present invention, the estimated wait time for the incoming contact is computed by taking into account the estimated predicted handling time for the incoming contact. In another embodiment of the present invention, the estimated wait time for the incoming contact is computed by taking into account the determined attributes of the incoming contact along with the skill sets of agents selected from the plurality of agents available in the contact center. It may further be appreciated by a person skilled in the art that by calculating the wait time for one incoming contact, the computing module 208 may compute total waiting time for all the contacts waiting in a queue of the contact center.

The reporting module 210 may report about the estimated wait time to the incoming contact. In an embodiment of the present invention, the computed estimated wait time for the incoming contact may be provided through a voice message, text message, or a pop up on the screen of the customer's device.

Figure 3:
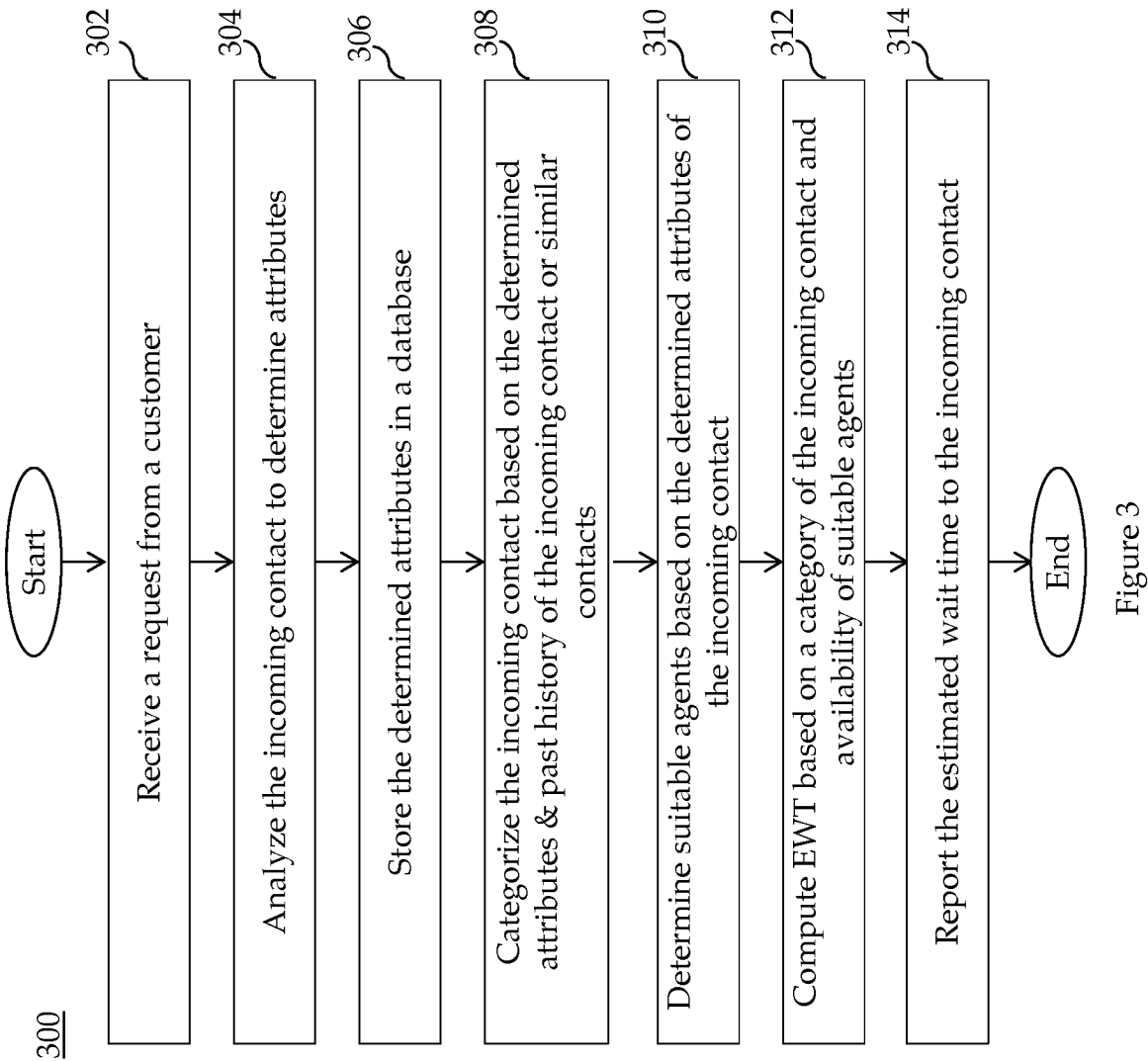
FIG. 3 is a flow diagram of a method for calculating an estimated wait time for customers, in accordance with an embodiment of the present invention.

FIG. 3 illustrates a method 300 for calculating context based Estimated Wait Time (EWT) for an incoming contact in a contact center, such as the contact center 100 (as described in conjunction with FIG. 1). In an embodiment, each incoming contact may need to register with the EWT system to provide his/her details to the contact center. The details corresponding to the contact may be stored in a database (such as the database 212) of the contact center.

At step 302, a contact center 100 receives a work request from a customer (or a contact). In an embodiment of the present invention, the contact may make a request for a product or a service from a contact center by making a telephone call to the contact center. In another embodiment of the present invention, the request may be made by sending text messages, emails, web chats etc. In yet another embodiment of the present invention, the request may be made by the incoming contact through a video call, or a voice call.

At step 304, the incoming contact may be analyzed to determine one or more attributes corresponding to the incoming contact. The attributes corresponds to details of the incoming contact and purpose of calling (or requesting) by the incoming contact. In an embodiment of the present invention, the analysis of the incoming contact is based on analysis of present and past communications of the incoming contact with the contact center. In an embodiment, the incoming contact may be analysed based on at least one of email messages, web chats, text messages and sentiments of the incoming contacts.

Further, in another embodiment of the present invention, the sentiments of the incoming contacts may be analyzed through one or more social networks, or the contact itself. The sentiments may include positive sentiments and negative sentiments. The positive sentiments may indicate that the customer is happy and satisfied during his/her communication with the contact center. The negative sentiments may indicate that the customer is unhappy and unsatisfied during the communication with the contact center.

Further, the attributes of the incoming contact may be determined by analyzing activities corresponding to selection of options, by the incoming contact, from an IVR menu of the contact center. For example, the attributes may be analyzed through input keys selected by the contact in an IVR menu of the contact center. In addition, details of the incoming contact may also be mined from the details entered by the customer such as PIN number. For example, the PIN number entered by a customer may indicate that the customer is an existing customer, or a new customer of the contact center. If the customer is an existing customer, the method may further determine whether the customer is a gold customer or a premium customer, with a strong propensity to purchase goods and services.

At step 306, one or more attributes (or characteristics) determined corresponding to each incoming contact may be stored in the database. In an embodiment of the present invention, the one or more characteristics corresponding to the incoming contact may include the determined attributes and activities related to the selection of options from an IVR menu of the contact center 100. In another embodiment of the present invention, the method may further store past history of the incoming contact handled by one or more agents of the contact center.

At step 308, incoming contact is categorized based on the determined attributes and past history of the incoming contact or similar contacts. In an embodiment of the present invention, the method may categorize the received contact based on the determined attributes of the incoming contact. In another embodiment of the present invention, the method may further categorize the incoming contact based on the history of the incoming contact or similar contacts stored in the database 212 of the EWT computing system 112. In an embodiment of the present invention, the incoming contact may be categorized as a complex contact or simple contact. For example, if the context of the contact indicates that the request of the contact includes multiple queries, it may be categorized as a complex contact. Otherwise, if the request of the contact includes a single request, it may be categorized as a simple contact. Further, a sub-category in a category may be created for a contact based on the context analysis. For example, if the context of the contact indicates that the request of the contact includes multiple queries and a negative sentiment, it may be categorized as a complex negative contact. Otherwise, if the context of the contact indicates that the request of the contact includes multiple queries and a positive sentiment, it may be categorized as a complex positive contact.

At step 310, availability of suitable agents from a plurality of agents to handle the incoming contact is determined. In an embodiment of the present invention, the method may select one or more suitable agents from a plurality of agents based on a match of the determined attributes of the incoming contact against attributes of the available agents. For example, if a contact (customer) is showing negative sentiments during a contact, a set of agents is selected that may have the ability to handle such customers with an ease, or may have an experience of handling similar contacts in the past. Further, for example, if the contact has a query (or request) corresponding to a particular department, such as a credit card department, then agents from the credit card department may be determined to serve the contact.

Further, in an embodiment, if the contact has more than one query (or request), one or more agents having proficiency to resolve all the queries of the contact may be selected. For example, if through the analysis of the incoming contact, it is determined that the contact has one query specific to a credit card department and another query related to his/her bank account information, an agent who has proficiency in resolving credit card related queries and has sufficient knowledge and authority (from the contact center) to handle queries related to bank account information of the contact may be selected. Additionally, in this case, more than one agent (for example, two agents) may be pre-selected based on the attributes determined based on the analysis of the contact.

In another embodiment of the present invention, the method may select a set of suitable agents from a set of available agents associated with the category of the incoming contact. The set of suitable agents may include agents that are associated with the category of the incoming contact.

At step 312, an estimated wait time for the incoming contact is computed. In an embodiment of the present invention, the method may estimate a predicted handling time for the incoming contact based on a category of the incoming contact and availability of suitable agents to handle the incoming contact. For example, if an agent has handled similar contacts in the past, then the method may estimate a predicted handling time for the contact based on the stored records i.e., past history of the agents in the database 212.

Further, the method may then utilize the predicted handling time for the incoming contact to compute total estimated wait time for the incoming contact. In an embodiment of the present invention, the estimated wait time for the incoming contact is based on the determined attributes of the incoming contact, performance and capabilities of the agents in handling similar contacts in the past.

At step 314, the computed estimated wait time is reported to the incoming contact. In an embodiment of the present invention, the computed estimated wait time for the incoming contact may be provided to the customer through a voice message, text message, or a pop up on the screen of the customer's device.

The exemplary systems and methods of this present invention have been described in relation to a contact center. However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or Estimated Wait Time (EWT) computing system and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a Estimated Wait Time (EWT) computing system, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An Estimated Wait Time (EWT) computing system to compute estimated wait time for customers in a contact center, the EWT computing system comprising:
    a processor;
    a memory coupled to the processor, the memory comprising one or more instructions that, when executed by the processor, provide:
        an analysis module configured to analyze each incoming contact to determine attributes corresponding to the incoming contact;
        a categorization module configured to assign the incoming contact to a category of incoming contacts, based on the determined attributes and a past history of the incoming contact or a previous contact that shares an attribute with the incoming contact, the past history retrieved from the memory; and
        a computing module configured to compute an estimated wait time for the incoming contact based on the category of the incoming contact and availability of suitable agents to handle the incoming contact, wherein suitability of an agent is determined by matching the category of the incoming contact with one of skill sets and past experiences of agents; and
    a natural language processing (NLP) engine comprising:
        a communication interface to receive the incoming contact;
        a memory interface to couple the NLP engine to the memory; and
        a processing interface to the analysis module,
        wherein the NLP engine computes an accurate representation of a context and complexity of the incoming contact.

2. The EWT computing system of claim 1, wherein the analysis module analyzes the incoming contact based on at least one of email messages, web chats, text messages, sentiments on one or more social network and voice calls corresponding to the incoming contact.

3. The EWT computing system of claim 1, wherein the analysis module determines the attributes of the incoming contact by analyzing activities corresponding to selection of options, by the incoming contact, from an IVR menu of the contact center.

4. The EWT computing system of claim 1, wherein the determined attributes correspond to details and purpose of the incoming contact.

5. The EWT computing system of claim 1, wherein the analysis module further analyzes the context of the incoming contact.

6. The EWT computing system of claim 1 further comprising a database to store the one or more characteristics corresponding to each incoming contact, the one or more characteristics corresponding to the incoming contact comprise the determined attributes and activities corresponding to selection of options from an IVR menu corresponding to the contact center.

7. The EWT computing system of claim 1 further comprising a determination module configured to determine one or more suitable agents from a plurality of available agents in the contact center based on the determined attributes of the incoming contact.

8. The EWT computing system of claim 1, wherein the determination module matches the determined attributes of the incoming contact with skill sets of each of the plurality of available agents to select the suitable agents from the plurality of agents.

9. The EWT computing system of claim 8, wherein the determination module determines the suitable agents from the plurality of agents available at a time of receiving a request from the incoming contact.

10. The EWT computing system of claim 8, wherein one or more characteristics corresponding of the determined agents comprise skill sets of the determined agents, and an experience of past dealing with one or more contacts having attributes shared with the incoming contact.

11. The EWT computing system of claim 1, wherein the computing module computes the estimated wait time for the incoming contact based on a predicted handling time for the incoming contact.

12. The EWT computing system of claim 1 further comprising a reporting module configured to report the estimated wait time to the incoming contact.

13. A computer-implemented method to calculate context based estimated wait time for customers, the method comprising:
    analyzing, by a processor coupled to a memory, each incoming contact to determine attributes corresponding to the incoming contact;
    processing the incoming contact by a natural language processing (NLP) engine, the processing comprising:
        receiving the incoming contact via a communication interface; and
        retrieving attributes of previous similar contacts via a memory interface that couples the NLP engine to the memory;
        wherein the NLP engine computes an accurate representation of a context and complexity of the incoming contact;
    categorizing, by the processor, the incoming contact to a category of incoming contacts, based on the determined attributes and a past history of the incoming contact or a previous contact that shares an attribute with the incoming contact, the past history retrieved from the memory; and
    computing, by the processor, an estimated wait time for the incoming contact based on the category of the incoming contact and availability of suitable agents to handle the incoming contact, wherein suitability of an agent is determined by matching the category of the incoming contact with one of skill sets and past experiences of agents.

14. The computer-implemented method of claim 13, wherein the incoming contact is analyzed based on at least one of email messages, web chats, text messages, sentiments on one or more social network, and voice calls corresponding to the incoming contact.

15. The computer-implemented method of claim 13, wherein the attributes of the incoming contact are determined by analyzing activities corresponding to selection of options, by the incoming contact, from an IVR menu of the contact center.

16. The computer-implemented method of claim 13 further comprising storing one or more characteristics corresponding to each incoming contact, the one or more characteristics corresponding to the incoming contact comprise the determined attributes and activities corresponding to selection of options from an IVR menu corresponding to the contact center.

17. The computer-implemented method of claim 13, wherein the suitable agents are determined from a plurality of available agents based on the determined attributes of the incoming contact.

18. The computer-implemented method of claim 13 further comprising reporting the estimated wait time to the incoming contact.

\* \* \* \* \*